United States Patent [19]

Van Bemmelen

[11] 4,107,784
[45] Aug. 15, 1978

[54] MANAGEMENT CONTROL TERMINAL METHOD AND APPARATUS

[76] Inventor: Henri M. Van Bemmelen, 21 W. Bank Rd., Rye, N.Y. 10580

[21] Appl. No.: 643,173

[22] Filed: Dec. 22, 1975

[51] Int. Cl.² .............................................. G06F 3/02
[52] U.S. Cl. .................................................. 364/900
[58] Field of Search .................... 340/172.5, 365 R; 445/1; 364/200, 900, 900 MS

[56] References Cited

U.S. PATENT DOCUMENTS

| | | | |
|---|---|---|---|
| 3,158,317 | 11/1964 | Alexander | 340/365 R X |
| 3,187,321 | 1/1965 | Kameny | 340/365 R X |
| 3,286,039 | 11/1966 | Stokes | 340/365 R X |
| 3,381,276 | 4/1968 | James | 340/172.5 |
| 3,394,368 | 7/1968 | Carr et al. | 340/365 R X |
| 3,560,964 | 2/1971 | Bedell et al. | 340/365 R |
| 3,631,403 | 12/1971 | Asbo | 364/200 |
| 3,823,388 | 7/1974 | Chadima et al. | 340/172.5 |
| 3,940,742 | 2/1976 | Hudspeth et al. | 340/172.5 |
| 3,976,975 | 8/1976 | Cockran | 364/900 |

Primary Examiner—Harvey E. Springborn
Attorney, Agent, or Firm—Parmelee, Johnson, Bollinger & Bramblett

[57] ABSTRACT

Management control terminal method and apparatus are provided in which the management control terminal as a whole is divided into two sections, namely, a custom application module (CAM) and a central master unit (CMU) which can be plugged together to form a CAM-CMU set having particular attributes uniquely adapted for conveniently performing a particular management function. The CMU contains local computing ability and local storage ability and can communicate with peripheral equipment and with a main centralized computer for updating the computer from time-to-time, and the CAM determines the nature of the CMU thereby converting the management control terminal as a whole into one which is especially adapted or customized for a particular application. The CAM has a keyboard layout and key functions arranged for the convenience of the user in applying the terminal to a particular task; the CAM contains an application program which controls the operation of the CMU to customize its operation to that particular task by automatically processing the data in a way suited to that task; in addition, the application program flashes prompting instructions on a screen reminding the user of the sequence of steps to be followed for performing the task and introducing the user as to the next data to be entered into the keyboard. When the CAM is unplugged and replaced by another CAM, the terminal as a whole is now converted into one which is dedicated to and conveniently arranged for performing another management control function, and thus the user obtains the benefits of having a specialized computer customized to a particular management control function at a low cost for planning or operations systems.

18 Claims, 16 Drawing Figures

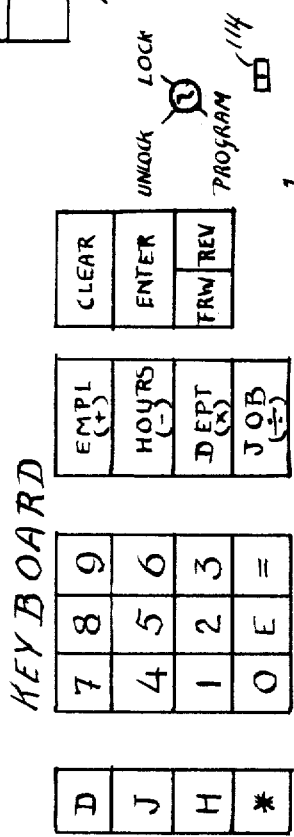
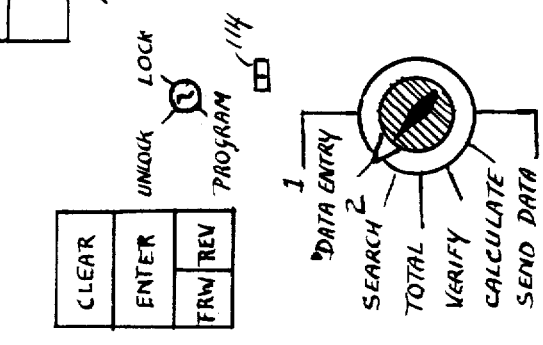
Fig 6

STEP NO 3    TIME OUT AND HOURS WORKED ARE ENTERED
PROMPTER

| | | | | EMPL NO | | | TIME OUT | HRS W'KD |
|---|---|---|---|---|---|---|---|---|
| | | | | | | | | |

46

READOUT

| 0 8 3 0 | H
| 0 5 0 0 | I
| 0 8 0 0 | J
| | |

44

KEYBOARD

| 7 | 8 | 9 |
|---|---|---|
| 4 | 5 | 6 |
| 1 | 2 | 3 |
| 0 | • | = |

| D |
| J |
| H |
| * |

| EMPL (+) |
| HOURS (−) |
| DEPT (×) |
| JOB (÷) |

| CLEAR |
| ENTER |
| FRW REV |

UNLOCK — LOCK
PROGRAM
114

1 DATA ENTRY
2 SEARCH
TOTAL
VERIFY
CALCULATE / SEND DATA

RESPONSE

H. "0830" APPEARS ON READOUT AND "TIME OUT" ON PROMPTER

I. "0500" APPEARS ON READOUT AND "HOURS WORKED" ON PROMPTER

J. "0800" APPEARS ON READOUT AND "EMPL NO" ON PROMPTER

OPERATION

H KEYS 0-8-3-0 ARE DEPRESSED (TIME IN)

I KEYS 0-5-0-0 ARE DEPRESSED (TIME OUT)

J KEYS 0-8-0-0 ARE DEPRESSED (HOURS WORKED)

K STEPS "E" THROUGH "J" ARE REPEATED FOR ALL EMPLOYEES

Fig 7

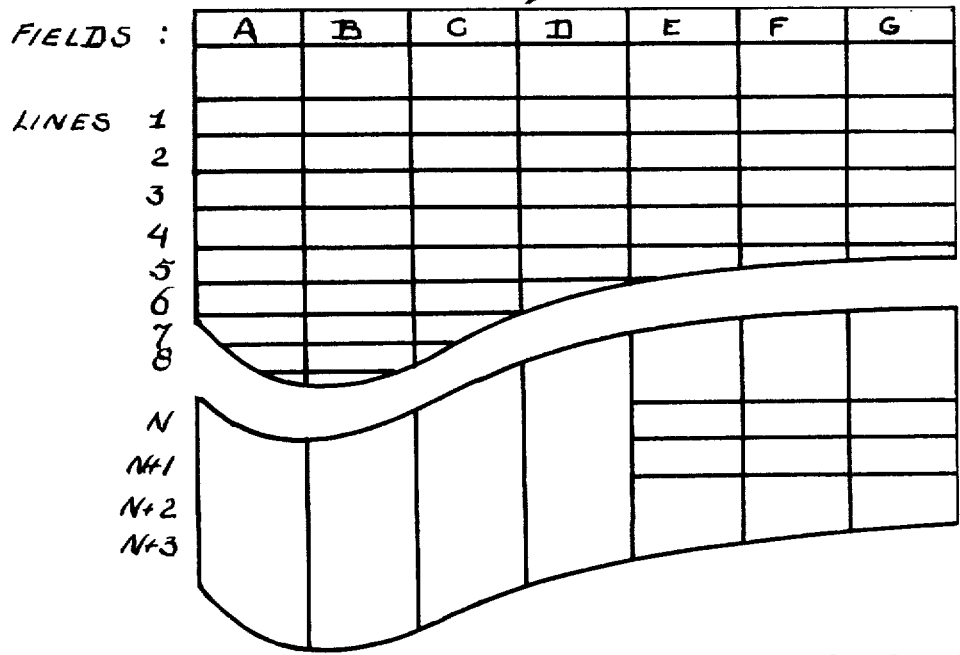

Fig. 10

EXAMPLE 2 — CASH REGISTER APPLICATION

| FIELD DEFINITION | LINE | FIELD | |
|---|---|---|---|
| A = ITEM | N | E | = Total Price = $\sum_1^N E$ in $ |
| B = DEPT | N | G | = Total Tax = $\sum_1^N G$ in $ |
| C = AMT/QUANT | | | |
| D = UNIT PRICE | N+1 | E | = Total D = NE + NG |
| E = PRICE EXTENSION = C×D | N+2 | E | = AMT TENDERED = X |
| F = TAX? (Y or N) | N+3 | E | = CHANGE DUE = X − (N+1)E |
| $f_1$ = TAX RATE (%) | | | |
| G = TAX EXTENSION = E×$f_1$ | | | |
| X = AMT. TENDERED | | | |

EXAMPLE 3 — SHIPPING ORDER APPLICATION

| FIELD DEFINITION | LINE | FIELD | |
|---|---|---|---|
| A = PRODUCT I.D. | N | E | = Total Price = $\sum_1^N E$ in $ |
| B = WEIGHT/UNIT IN OZ | N | F | = Total Wt = $\sum_1^N F$ in LBS |
| C = $/UNIT | N+1 | F | = SHIP. COST. = NF × $f_1$ |
| D = NUMBER OF UNITS | N+2 | E | = Total Price + Ship Cost = NE + (N+1)F |
| E = PRICE EXTENSION = C×D | N+3 | E | = TAX = (N+2)E × $f_2$ |
| F = WEIGHT EXTENSION = 16×B×D CONVERTED TO LBS AND FRACTIONS | N+4 | E | = TOTAL = (N+2)E + (N+3)E |
| | N+5 | E | = RECEIVED = X |
| $f_1$ = SHIPPING RATE | N+6 | E | = NET DUE = (N+4)E − (N+5)E |
| $f_2$ = TAX RATE | | | |
| X = AMT RECEIVED | | | |

| MEAT | 7 | 8 | 9 | /FOR | DISCOUNT |
|---|---|---|---|---|---|
| PRODUCE | 4 | 5 | 6 | NON TAX | AMT TENDERED |
| GROCERY | 1 | 2 | 3 | ENTER | VOID |
| DELI | 0 | CLEAR | | | NO SALE |
CASH REGISTER
Fig. 11
MEMORY 
HIT CLEAR 

CASH REGISTER

STEP №3  DISCOUNT COUPONS ARE ENTERED

KEYBOARD

HIT CLEAR O

| MEMORY O | | | |
|---|---|---|---|
| MEAT | 7 | 8 | 9 | /FOR | DISCOUNT |
| PRODUCE | 4 | 5 | 6 | NON TAX | AMT TENDERED |
| GROCERY | 1 | 2 | 3 | ENTER | VOID |
| DELI | 0 | CLEAR | | | NO SALE |

READOUT

G.  | 1 | 8.83 | 0.10 |
H.  | 4 | 8.53 | 0.10 |
I.  | 2 | 8.25 | 0.15 |
    | — | ——— | ——— |

RESPONSE

G. "10" APPEARS IN 1ST FIELD, "883" IN 2ND FIELD AND "1" IN QUAN FIELD

H. "10" APPEARS IN 1ST FIELD, "853" IN 2ND FIELD AND "4" IN QUAN FIELD

I. "15" APPEARS IN 1ST FIELD, "825" IN 2ND FIELD AND "2" IN QUAN FIELD

OPERATION

G. "GROCERY" KEY, "DISCOUNT" KEY, KEYS 1-0 AND THEN "ENTER" KEY ARE DEPRESSED

H. "ENTER" KEY IS DEPRESSED 3 TIMES (QUAN = 4)

I. DELI DISCOUNT COUPONS (2) ARE ENTERED AS IN "H" ABOVE

Fig 14

CASH REGISTER

READOUT

| 11.77 | 20.00 |

STEP N°4 TRANSACTION IS COMPLETED

MEMORY  HIT CLEAR
O       O

KEYBOARD

| MEAT | | 7 | 8 | 9 | | /FOR | | DISCOUNT |
| PRODUCE | | 4 | 5 | 6 | | NON TAX | | AMT TENDERED |
| GROCERY | | 1 | 2 | 3 | | ENTER | | VOID |
| DELI | | 0 | CLEAR | | | | NO SALE |

OPERATION

J. "AMT TENDERED" KEY, KEYS 2-0-0-0 ($20.00) AND THEN "ENTER" KEY ARE DEPRESSED

RESPONSE

J. "20.00" APPEARS IN THE 1ST FIELD AND "11.77" (CHANGE) IN THE 2ND FIELD

*Fig 15*

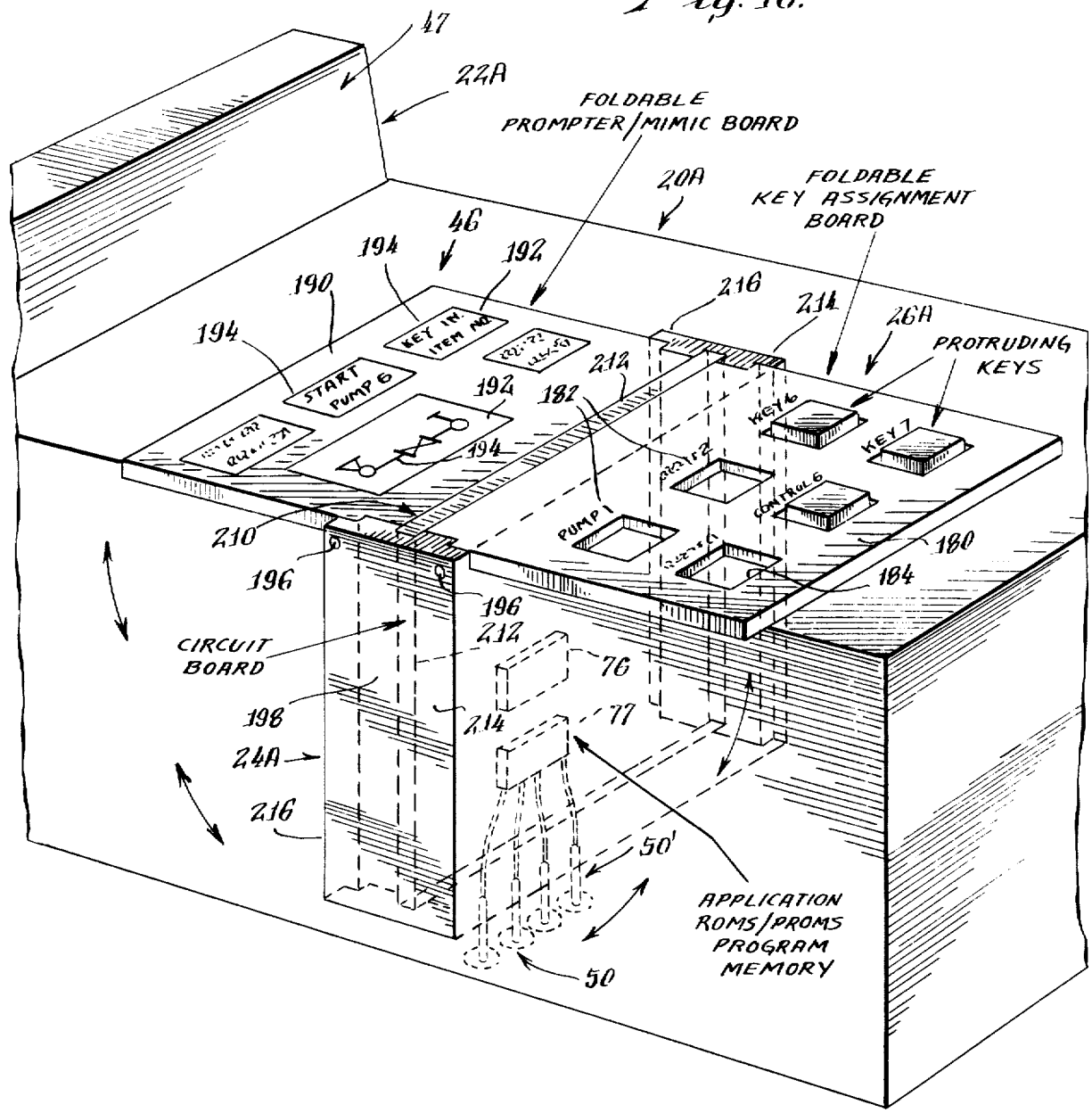

MANAGEMENT CONTROL TERMINAL METHOD AND APPARATUS

FIELD OF THE INVENTION

The present invention relates to computer terminals and more particularly to management control terminal method and apparatus.

BACKGROUND OF THE INVENTION

A typical digital computer consists of four main hardware components. These components are the central processing unit (CPU), the input and output units, and the memory. The CPU is designed to control the sequencing of program steps and to gate information through the various units in the computer, such as the arithmetic unit, the accumulator registers, and to pass information to and from the memory as well as the input/output units. Input/output units serve to transfer data to and from external devices, such as printers, tapes, disks, displays and external communication links.

The memory is used to hold programs and data needed during the execution of the program. Since the main memory usually retains information in the form of changeable states (whether on or off) of numerous binary core or semi-conductor elements, the contents of the memory can be read and also can be changed by writing into the appropriate address.

The larger modern computers contain one or several of the following types of programs in order to maximize the efficiency to the user:

A. An operating system program to control the interactions between other program elements, peripheral devices and data files.

B. A scheduler program to set up the sequencing of the various tasks required.

C. Application programs to carry out the required calculation or process control.

D. Various other programs relating to linkage routines and peripheral drivers.

E. In addition, a large computer may include various translator or compiler programs to translate operator instructions into computer programs.

Because the main memory is finite in size, application programs and data are usually shuttled in and out of the main memory from some auxiliary storage, such as magnetic tape on an as needed basis, if there is space available. However, during the time that a program is being executed, that particular program and pertinent data reside in the main memory.

Human communications with the computer occur through consoles, printers and cathode ray tube displays. Through these input and output peripheral devices, the operator sends instructions to the computer and can also provide data and interpret the results.

Recent developments include remote terminal and time-shared systems. In such systems, many users, often remote from the computer can use the system more or less simultaneously, through communication with the computer during very rapidly accessible time-slices. Typical of these recent systems are the time-sharing services which are commercially available and the airline reservation systems. In these systems, the terminal is a passive device intended to provide communication between the operator and a centralized computer.

DISCUSSION OF THE PRIOR ART

A user, for example such as a department manager, a project engineer, a retail store or warehouse manager, or a general contractor, who has a need for rapid turn-around in the processing of data experiences the following limitations, or frustrations, in using the conventional prior art apparatus available today:

1. If he or she purchases or leases the computer for exclusive availability, the full cost of the whole system, including the terminals as well as the main processor, must be borne alone.

2. If he or she shares the computer with a number of other terminal users, there is a share of increased cost which must be borne. This increased cost results from the increased complexity of the network necessary to handle the communications traffic from the various users involved. Moreover, a time sharing community is currently limited to approximately 100 terminals because of the uneconomical complexity arising from the burden on the centralized processing unit of contending with the handling of communications from a larger number of terminals. In addition, the time sharing system is best suited for users presenting scientific type problems, because the CPU has complex programs which can handle scientific problems and computations.

3. Time sharing is a costly alternative commercially for order entry over telephone lines, because of the need for a very large computer to deal with the communications problems involved.

4. The terminal in a particular department, project area, retail store, warehouse or contractor's office cannot be completely customized to the needs of the individual operator. Program requirements of the central computer dictate that the on-line terminals must all have similar characteristics, if a large number of terminals are to share the system in a rapid response mode of operation. Thus, the individual user's desires and convenience with respect to the arrangement of the terminal are compromised in favor of the machine.

5. In an environment with a large number of low cost terminals, such as reservation system, the terminals can be used only for this one application. Hence, the total cost of the entire system must be amortized over this one application. If the user wishes to activate a number of different applications, he is forced to use a time-shared service with inherently lower numbers of terminals and higher software and communications overhead.

U.S. Pat. No. 3,645,441 – G. De Sandre shows a desk computer in which there are a plurality of working registers and one or more accumulating registers and a control keyboard with three groups of keys. The first key group is used for entering digits, the decimal point and an algebraic sign; the second group includes function keys for commanding the formation of algebraic sums in the accumulating registers and for transferring the contents of the accumulating registers to a main one of the working registers; and the third group comprising further function keys for commanding the formation of special functions of the contents of the two registers. A connecting key when operated in conjunction with one of the further function keys, transfers the number contained in a predetermined accumulating register to a particular working register, thereby designating this number as the operand in the performance of the function selected by the further function key which was depressed. The keyboard although being adapted for handling algebraic problems is not removable for customizing the computer to other applications and does not contain an application program. Moreover, there is no prompting arrangement for guiding a user through a sequence of steps.

U.S. Pat. No. 3,725,877 — R. B. Kell discloses a self-contained battery operated memory keyboard unit which is portable. An on-line inspector in a modern assembly plant may use this portable unit to gather information which is entered by pressing pushbuttons corresponding to the numeric code 0–99 which is temporarily stored for later transmission to a centralized computer. A tens and units visual display enables the inspector to check his entry before storing the data. There is no removable keyboard unit and no application program in the keyboard. No operations are performed on the data. Also, there is no prompting display for instructing the operator as to the sequence of steps to be followed.

U.S. Pat. No. 3,760,409 — M. A. Ruben and R. F. Collings shows a programmable keyboard having a plurality of key receiving matrix locations which can be programmed according to the type of key inserted at the matrix locations. At least four types of keys can be used each electrically connecting one switch terminal to a different combination of terminals so that the keyboard can be programmed by the type of key inserted at each matrix location. There is no removable keyboard unit containing an application program and no prompting apparatus.

U.S. Pat. No. 3,806,711 — E. E. Cousins, Jr. discloses an automatic merchandise pricing calculator containing a group of keys uniquely associated with the parameters applicable to the prices of various goods. Each group includes a key uniquely associated with each value of the associated parameter. The operator determines the price of a particular item of goods by pushing the associated keys on the keyboard, and the price is obtained from memory or calculated from values within the memory and is displayed. The pricing calculator does not include a removable keyboard unit containing an application program nor does it prompt the user in performing a sequence of steps.

U.S. Pat. No. 3,825,101 — N. B. Wineman discloses an auxiliary keyboard device which can be positioned over the keyboard of a typewriter. This auxiliary device has ten pushbuttons arranged in the usual pattern of the ten numerical keys of an adding machine and contains a mechanical arrangement for converting into a ten-key format the numerical keys of a typewriter. There is no application program in the auxiliary device and no prompting display for interaction with the operator.

U.S. Pat. No. 3,852,716 — J. A. Horn and K. L. Sawyer describes a point-of-sale processing system in which the keyboard has a large number of keys arranged in rows and columns in which each key corresponds to a particular item of goods. A price programmer is likewise arranged in an array of rows and columns such that each inter-section of a row and column corresponds to a single key on the keyboard. Thus, the prices of items can conveniently be up-dated. There is no removable keyboard, no application program associated with a removable keyboard which is customized to a particular application and no prompting apparatus for interaction with the user in following a predetermined sequence of steps in a transaction.

SUMMARY OF THE INVENTION

The present invention provides management control terminal method and apparatus which gives to the user the benefits of having a customized dedicated terminal dedicated to a particular management application and yet achieves these benefits at low cost. For example, various particular management applications which can benefit from use of the present invention and to which it is well suited are payroll records, purchase order entries, inventory control functions, cash register or point of sale transactions, sales analysis, and so forth. A computer terminal embodying the invention is called a management control terminal (MCT). This management control terminal as a whole is divided into two sections which can be coupled together by plugging a first section into a second section. The first section is called a "custom application module" (CAM), and the second is called the "central master unit" (CMU).

The CAM determines the particular application for which the management control terminal is to be dedicated, including: (1) a determination of the respective functions of the various keys on the keyboard to make them appropriate to that particular management application, (2) the prompting required to lead an operator through a sequence of operations appropriate to that application, and (3) the instructions of the application program for controlling and customizing the operation of the MCT to the particular application involved. In this particular embodiment of the invention, the instructions are contained in semiconductor memories; however other media for program storage can be used, such as magnetic program strips.

The CMU contains the local computing and local storage ability as well as the ability to communicate with a main large computer from time-to-time, when the occasion arises. The CAM in effect determines the nature of the CMU when plugged into it and thereby converts the management control terminal as a whole into one which is especially adapted or customized for a particular application.

Among the advantages of using the central master unit custom application module (CMU-CAM) set embodying the method and apparatus of the present invention are those resulting from the fact that this CMU-CAM set specifically provides the particular attributes which are uniquely adapted to a particular management application. The CMU-CAM set provides these three attributes: (1) the keyboard layout may be uniquely arranged and particular key functions may be included for the convenience of the user who is applying the set to a particular task, (2) the application program provides for automatically processing the data in a unique way suited to that task, and (3) prompting instructions are flashed on the display screen to remind the user of the unique sequence of steps to be followed in carrying out the application, and to instruct the user as to the next data to be entered.

Further advantages of management control terminal (MCT) method and apparatus embodying the present invention flow from its ability to provide simple custom management planning and control capabilities, such as: immediate search, retrieval, and totalizing of simple and calculated transactions, while maintaining the formatting capability for transmission to a larger computer.

Moreover, the ability to conduct pre-processing and the ability to store raw data and pre-processed data enables the management control terminal apparatus of the present invention to operate off-line. Thus, the need for continuous communications contact with the centralized computer is avoided. The centralized computer thereby becomes unburdened of queuing and contention problems. It can process the information from each CMU-CAM set when convenient, rather than on demand.

The present invention greatly increases the flexibility and range of abilities of a remote terminal centralized computer system. For example, complete low cost programmed systems can be provided by the convenient step of plugging various CAMs into the respective management control terminals. In addition, the system can be upgraded by subsequently plugging in additional CAMs intended to operate serially on the results of a previous module.

In summary, the management control terminal method and apparatus of the present invention enables complete customization for each particular application in the layout of the keyboard and/or the assignment of functions to the respective keys and also enables customization for the human interaction inherent with that application. Unlike an electronic calculator, this management control terminal prompts the operator as to the successive steps to be performed and alerts the operator as to operational requirements and displays error signals when the user does not properly follow the sequence of steps involved. It is programmed for handling the particular application. All of these customized attributes are incorporated in the custom application module. When a different custom application module is plugged in place, the functional assignment of the keys on the keyboard is changed as well as the actual application program, the operator prompting messages and alerting functions relevant to the new application.

The various features, aspects and objects of the present invention will be in part pointed out in and will be part understood from the following description which is to be considered in connection with the accompanying drawings.

BRIEF DESCRIPTION OF THE DRAWINGS

FIGS. 5, 6 and 7 illustrate the steps of a typical transaction, e.g., payroll data entry which can be carried out employing the management control terminal set as shown in FIGS. 1-3;

FIG. 9 is a diagram showing how the hardware and firmware in the CMU and how the hardware and software in the CAM operate;

FIG. 10 shows a generalized record format, as a generalized example of formatted data such as can be handled by a CMU-CAM set containing the programs as illustrated in FIG. 9;

FIG. 11 shows the keyboard layout of the CAM for handling cash register applications;

FIGS. 12 through 15 illustrate the steps of a typical cash register application, as carried out using the CMU-CAM set as shown in FIGS. 1-3 and 9, having a keyboard layout as shown in FIG. 11; and FIG. 16 shows a modified embodiment of a CAM as used in equipment of the type described.

DETAILED DESCRIPTION

Figure 1:
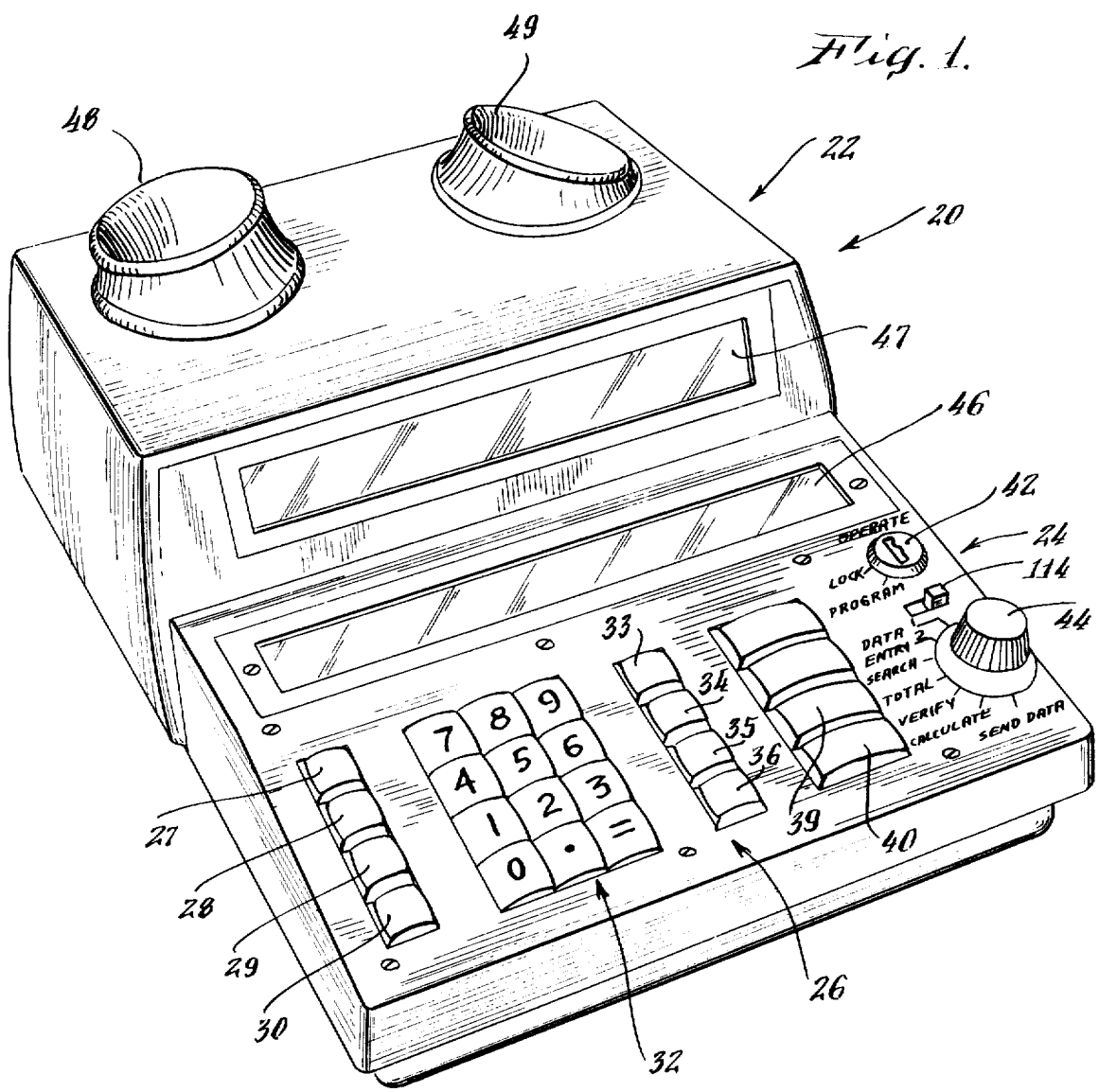
FIG. 1 is a perspective view illustrating a management control terminal embodying the method and apparatus of the present invention. This terminal as shown includes a central master unit with the custom application module plugged therein to form the complete terminal.

As shown in FIG. 1, the management control terminal 20 employing the method and embodying the apparatus of the present invention comprises a central master unit 22 (CMU) and a custom application module 24 (CAM) which includes a keyboard 26 and is detachably plugged into the CMU. The overall layout of the keyboard 26 and associated elements of the custom application module are conveniently arranged for a particular management function, for example, such as handling the payroll records of personnel in various departments, or of personnel working on various projects, or for handling retail sales records, purchase order records, inventory and warehouse records, or payroll records for contracting and subcontracting jobs. For example, the management control terminal shown in FIG. 1 is customized for handling the payroll records in a large company having numerous departments.

Advantageously, the present invention enables such a customized management control terminal to be provided at such reasonable cost that each department manager may have his or her own CAM to operate with strategically located CMUs in the department or office. The result is a greatly increased management efficiency in the utilization of the human resources within the company. At any instant, the department manager can retrieve the cumulative, up-to-the-minute payroll information of any person within the department and determine the hours worked and jobs performed, and so forth. There is no need for the manager to wait for a day or a week until a print-out can be obtained from the centralized computer which serves the company as a whole.

Figure 2:
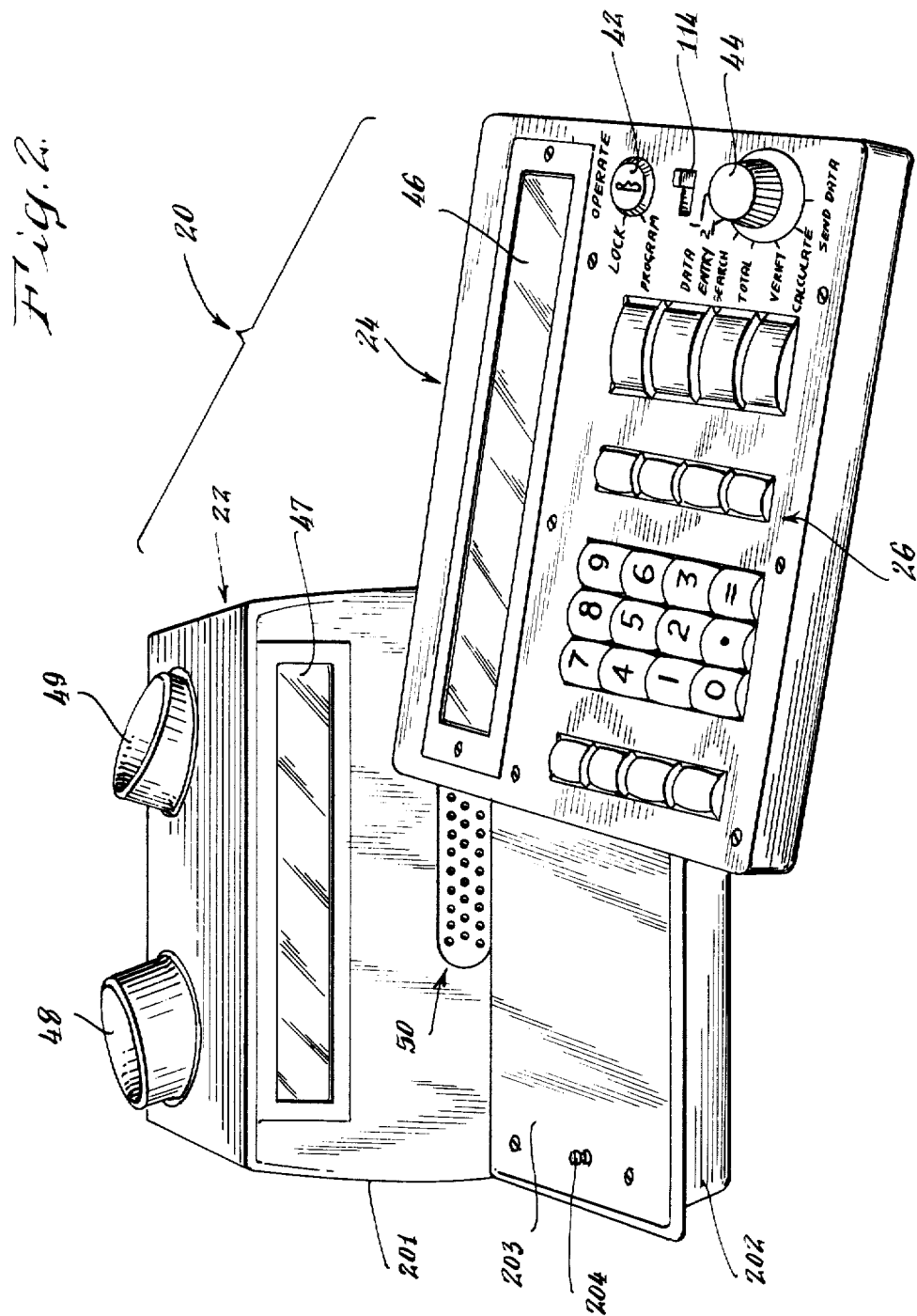
FIG. 2 is a perspective view showing the custom application module unplugged from the central master unit.

By unplugging the CAM 24 from the CMU 22, as is shown occurring in FIG. 2 and by plugging in a different CAM, the management control terminal 20 now immediately becomes completely customized to another application, for example, to handle the inventory or production records relating to that department, and so forth. In effect, the manager now has available by plugging in the respective CAMs, a number of customized computer terminals each specifically and conveniently adapted for application to a particular management function or sequence of functions.

At the left of the keyboard 26 on the CAM 24, there is shown a column containing four manually actuatable keys 27, 28, 29 and 30 which serve to separate the various components of non-formatted (free-formatted) data. These four keys bear the legends D, J, H and *, respectively. The D key 27 is pressed at the end of each record, the J key 28 at the end of each field, the H key 29 at the end of each line, and the * key 30 at the end of each file. Near the center of the keyboard is a group 32 of one dozen keys for the nine digits and zero together with a decimal point and an equals sign. To the right of these dozen keys is another column of four keys 33, 34, 35 and 36 bearing the legends "EMPL" (meaning Employee), "HRS" (meaning Hours), "DEPT" (meaning Department) and "JOB", respectively. These four keys 33 through 36 also bear the respective mathematical signs for the four functions, — add, subtract, multiply and divide. There is a final column of four keys 37, 38, 39 and 40 bearing the legends CLEAR, ENTER, FRW (Forward) and REV (Reverse), respectively.

A tumbler lock 42 can be turned by inserting a key to the "LOCK" or "UNLOCK" RUNNING positions. Additionally, if desired, a third key position may be provided which is called the "PROGRAM" position or mode and is used by management personnel to change variable constants in a RAM memory unit located in the CMU.

A rotatable mode selection control knob 44 is used to set the desired mode of operation of the management control terminal 20. For example, as shown in this particular embodiment, there are seven different operating modes: DATA ENTRY 1, DATA ENTRY 2, SEARCH, TOTAL, VERIFY, CALCULATE and SEND DATA. These different modes of operation are produced by different application programs stored in the CAM, and some may be omitted or changed for particular applications.

For example, a CAM to be used in engineering projects may include a "COST" mode which calculates the forecast cost of the project. A CAM to be used in a tax department may include a "TAX" mode which calculates the resultant tax.

Figure 4:
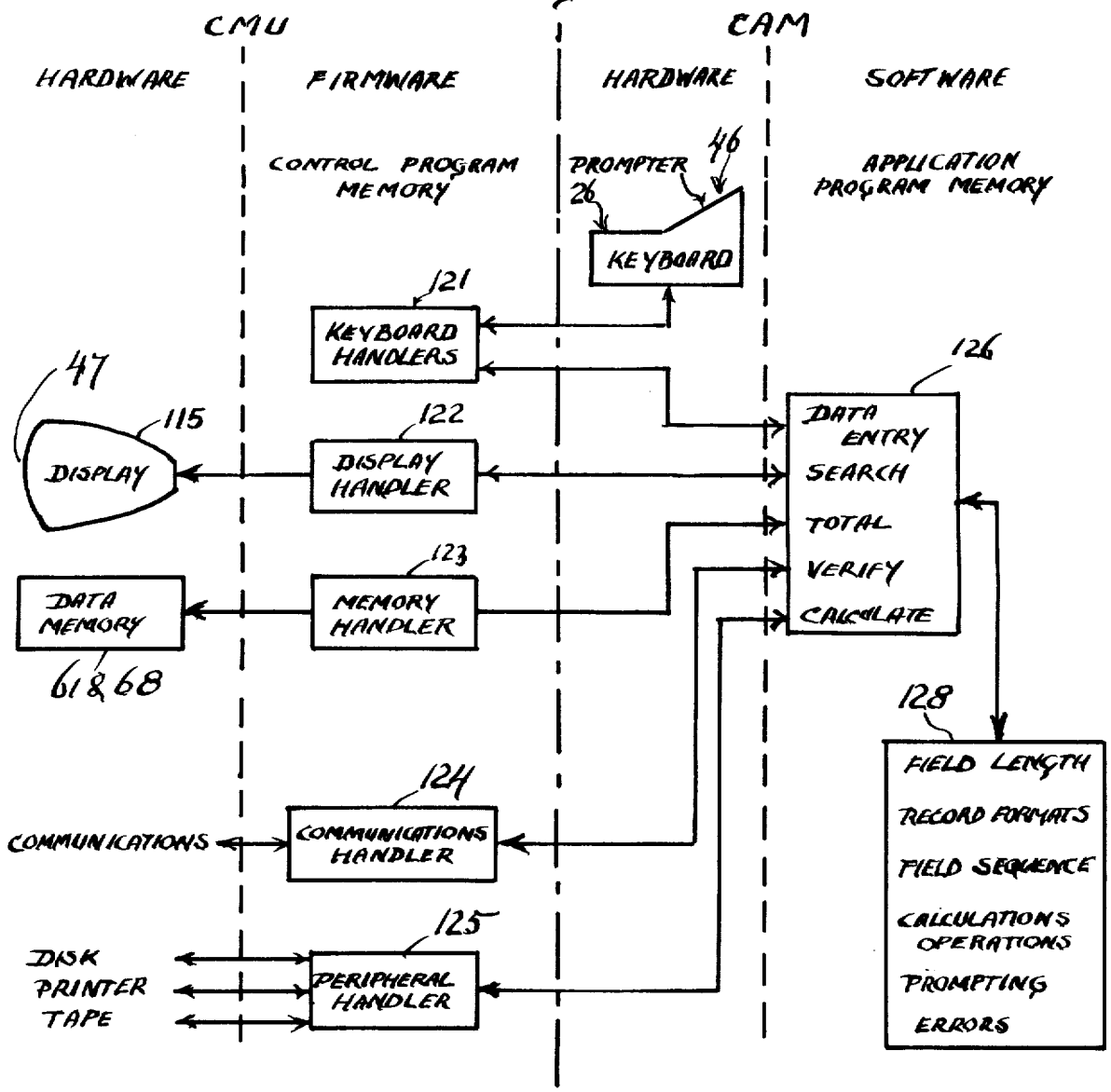
FIG. 4 shows an example of formatted data, e.g., a payroll record format.

DATA ENTRY 2 mode is for use in entering formatted data, for example, such as data in the format shown in FIG. 4. The prompter messages and error signals guide the user in carrying out the sequence of steps of a transaction involving the use of the formatted data of FIG. 4.

DATA ENTRY 1 mode is used in entering free formatted (non-formatted) data in which no one knowns in advance the number of digits to be entered at each step in the transaction.

SEARCH mode is used when the operator wishes to go back into the memory to search under a department number or an employee number to find out the total hours worked in a given department or for a given employee. This is explained in greater detail further below.

TOTAL mode is used when the operator wishes to obtain the total with respect to an employee, a job or department.

VERIFY mode is used to reduce possible errors in entry of formatted data. The operator puts in the data once and then repeats the entry of the same data. The CMU temporarily stores the first set of data and the second set of data and then compares them. If both sets of entries are the same in all respects, then the first set of data is assumed to have been correctly entered and is automatically entered into the CMU memory. If the two sets of data are not the same in all respects a "Faults Verify" signal is flashed, and the operator repeats the entry of the same set of data. If this third set of entries corresponds with the first set, it is assumed that the first set is correct, and it is automatically entered into the CMU memory. If not, then the "Faults Verify" signal remains and the operator pushes the CLEAR button 37 and repeats the two sets of entries.

CALCULATE mode is used for addition, subtraction, multiplication and division and additional arithmetic functions, implemented in either hardware or firmware which may be located in the CAM. Calculations can be carried out without losing the information which has already been stored in the memory units 61 and 62. That is, the display screen 47 only shows the specific items being worked on, but the memory units 61 and 62 retain the data which was previously keyed into the management control terminal.

SEND DATA mode serves to transmit data to some other location such as to a centralized computer.

Located behind the keys on the CAM 24 and related thereto for appropriate human interaction with the management control terminal 20 is operator prompting and error indicating device 46. This operator prompting and error indicating device may take any of several different forms, as will be explained. In this illustrative example, the device 46 comprises a display screen for showing various predetermined messages to remind or prompt the operator as to the sequence of steps to be performed in carrying out the transactions involved in a particular application, e.g. in handling payroll records for the various departments, and for showing various predetermined messages relating to various kinds of errors which can be made in connection with the transactions.

On the face of the CMU 22 is shown a readout screen 47. This readout screen may alternatively be located in the CAM 24 or readout screens may be included in both sections 22 and 24. If desired, the CMU 22 may be provided with acoustic or direct coupled input/output means 48, 49 for communication over a telephone line with the central processing unit. However, it is to be understood that the management control terminal 20 normally operates off-line. It may communicate with the centralized computer once a day at a convenient time for updating the data files in the centralized computer or may communicate with another companion management control terminal. Direct communication can also be provided such as by a commercially available data communications coupler, or by a dialler, ringer and handset, as alternative means for providing communications with a centralized computer or with a companion MCT.

As seen in FIG. 2, the CMU 22 includes an electrical connector shown as a socket 50 with multiple contacts adapted to be detachably engaged by a mating plug (not seen) on the rear of the CAM 24. Thus, the CAM 24 can conveniently be unplugged and set aside to be replaced by another CAM which is plugged into the CMU 22 and thereby converts the management control terminal as a whole into one which is now customized for another management function, such as for handling inventory records, entering orders, cash register functions and so forth.

Figure 3:
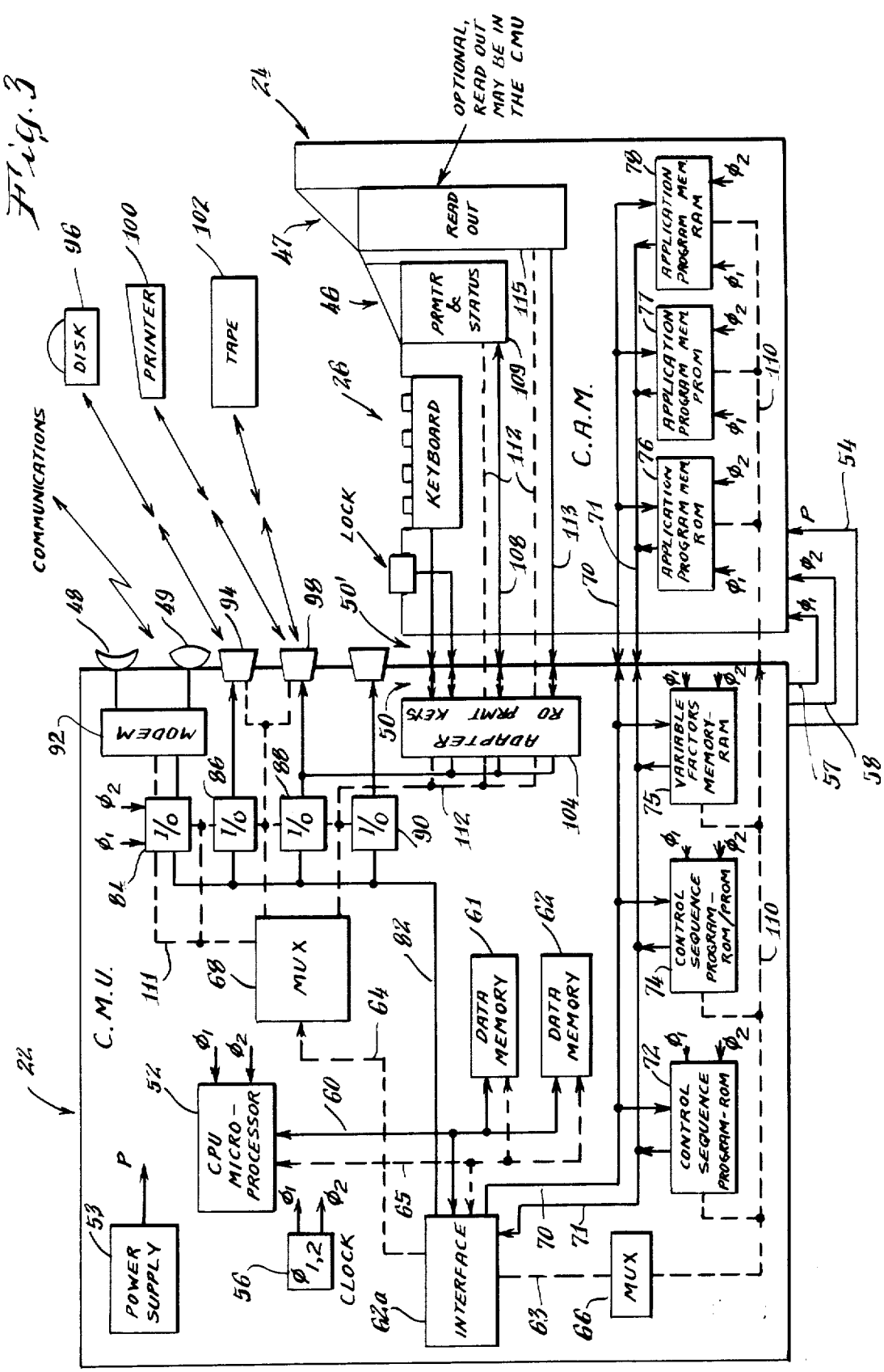
FIG. 3 is a schematic circuit diagram of the management control terminal including the CMU and the CAM.

FIG. 3 is a schematic circuit diagram of the whole management control terminal 20 including the CMU 22 and the CAM 24. The reference number 50 between these two sections 22 and 24 indicates the socket, and the arrowheads adjacent thereto indicate the plug contacts for providing electrical interconnections between the CMU and CAM. Within the CMU 22 there is a small central processing unit 52 in the form of a micro processor, for example such as the micro processor chips which are commercially available capable of various processing functions, such as memory, addition, sequencing, indexing, control, etc. At the end of the specification, there is provided additional information about a suitable commercially available microprocessor which can be used and also about the commercial sources and commercial designations for other electronic components which are included in the CMU and CAM in this specific embodiment of the invention.

There is a power supply 53 which can be plugged into any convenient alternating current output and which transforms, rectifies and filters the electrical power so as to provide direct current power P of appropriate voltage. It is to be understood, as well known to those skilled in the art, that this electrical power P is supplied to all the required electronic components in the CMU and the CAM. The arrow 54 at the bottom of FIG. 3 indicates that power P from the power supply 53 is also fed into the electronic components of the CAM, when the latter is plugged into the CMU. Alternatively, a battery supply can be used.

The CMU includes sequencing means comprising a standard clock circuit 56 which provides two trains of sequencing clock pulses as indicated by the arrows and symbols $100_1$ and $\phi_2$. As shown by the arrows 57 and 58, and by the symbols $\phi_1$ and $\phi_2$, these respective clock pulses are fed into the appropriate electronic components of the CAM.

The small CPU 52 is connected through a data bus 60 with at least one data memory unit. In this example two data memory units 61 and 62 are shown connected through the data bus 60 to the CPU 52; however it is to be understood that more such memory units can be included in the CMU depending upon the amount of local solid state data storage capacity desired to be built into the CMU. The microprocessor 52 is also connected by the data bus 60 with an interface unit 62a which serves to couple the microprocessor 52 with a number of different units in the CMU and also in the CAM and with external devices, as will be explained further below. The interface unit 62a provides for the synchronization of the operation of the other components as indicated by the three dashed synchronization control circuits 63, 64 and 65. The synch control circuit 63 interconnects the interface unit 62a with a first multiplexer circuit 66, while the synch control circuit 64 connects the interface unit 62a with a second multiplexer 68. The third synch control circuit 65 interconnects the interface unit 62a with the microprocessor 52 and with the respective data memory units 61 and 62.

The interface unit 62a is connected through data busses 70 and 71 with one or more micro-program sequencer units 72 and 74 which are labelled "Control Sequence Program" and which in this embodiment are shown as a read only memory ROM and a programmable read only memory (PROM), respectively, of the metal oxide semiconductor (MOS) type. These control sequencer units 72 and 74 contain a sequence of instructions for controlling the operation of the CPU 52. The ROM/PROM units 72 and 74 are connected to the microprocessor 52 through the interface unit 62a to provide the processing capability desired. Some random access memory (RAM) is also included and may be used for storage of variable constants or factors or frequently updated data. This random access memory unit 75 is called a "Variable Factors Memory" and is connected to the data busses 70 and 71. There are applications in which are used constants, factors or values which require periodic updating. In some cases, only supervisory personnel will be allowed to perform the updating. As an example, a cash register function may involve periodic updating of the price of an item or, possibly, the monetary exchange rate of one currency to another. In a cost accounting application, the labor rates or overhead burden rates may have to be changed periodically.

Since the CMU or CAM include variable random access memory (RAM) units 75 and 78, as well as fixed read only memory (ROM) units or semi-fixed programmable read only memory (PROM) units, the key lock in the CAM may include a "PROGRAM" position. Turning the key to the PROGRAM position causes the management control terminal as a whole to go into a PROGRAM mode which allows the operator (supervisor) to insert new values in the variable constant or variable factor positions in the program. Such variable factors may be factors such as interest rates, prices, foreign exchange rates, hourly wage rates, overhead burden rates, and the like. Since an authorized person in management, such as a supervisor, is the only one to have a key capable of turning to the PROGRAM mode, the access to revising the variable factors of the program is limited.

Upon completion of the desired changes, the supervisor returns the key to its normal UNLOCK (Running) position. At this point, the machine program returns to its intended application program as determined by the CAM. The operator can now operate the MCT as before, except that new variable factors are included in the program.

This facility to update variable constants can be incorporated in either the same CAM as was described above, or in a separately supplied CAM designed specifically for the program mode. It is presently preferred to use a separate CAM specifically intended for updating the variable factors, because this separate CAM has its own prompter messages for instructing the supervisor as to the sequence of steps to be followed. In this case, the variable factors of the program remain in the RAM unit 75 in the CMU.

In summary, the application CAM periodically accesses this RAM unit 75 as needed in carrying out the application program, while the special PROGRAM CAM is able to modify the values of the factors within this RAM unit 75. The supervisor has exclusive possession of the PROGRAM CAM, and thus is the only person who has access for modifying these values.

This particular embodiment uses a four bit microprocessor 52, although other eight or sixteen bit microprocessors could be used. Conceivably, in the future, a microprocessor chip could be developed to include the control sequence program functions of the units 72 and 74.

The interface unit 62a is connected by the data busses 70 and 71 through the plug connection 50 with extensions of these same busses 70 and 71 going into the CAM in which is located the customized application program. This customized application program in this embodiment is stored in three memory units 76, 77 and 78 which are shown as a ROM and a PROM of the MOS type and as a RAM unit, respectively. They contain instructions for modifying and controlling the operation of the MCT as a whole, so as to make its operations become tailored to the particular transaction involved.

For example, as shown in FIG. 4, the payroll record format 80 has eight vertical columns, each of which is referred to as a "field" of the record. A horizontal row of data is referred to as a "line". Therefore, in the format 80, each line contains data in eight fields. The data in the first field, namely defining the date, are always expressed in six decimal numbers, while the data in the succeeding seven fields of the record always are expressed in four decimal numbers.

Thus, the application program as provided by the units 76, 77 and 78 in the CAM for handling payroll records is arranged to recognize that the first field in each line should contain six decimal digits, that is, six keys of the keyboard should be depressed for entry thereof. As soon as this six digit data has been entered at the beginning of each line, the prompting message PAYROLL ID (Payroll Identification) is flashed on the screen 46 to prompt the operator, and so forth. As will be explained further below. Thus, the application program in this CAM 24 makes the management control terminal 20 as a whole uniquely and conveniently well suited for handling the transactions of this application.

The application program also can process the data involved. For example, in handling the payroll record data from the form 80 of FIG. 4, it is seen that the data for hours worked appearing in the eighth field can be calculated by adding 1200 to the data for TIME OUT appearing in the seventh field and then subtracting the data for TIME IN appearing in the sixth field and also subtracting 0030 to allow thirty minutes for lunchtime. Thus, this application program performs these computations. If the data entered into the sixth, seventh and eighth fields of the line does not fit this computation, then an error message FAULTS VERIFY flashes on the prompting and error indicating screen 46.

Other management applications involve other formats of the data and the application program in the CAM which is customized for that application is uniquely suited for handling the transactions of that application and for prompting the operator through the sequence of steps involved.

Within the CMU the interface unit 62a may be connected through a data bus 82 with two or more input/output circuits, four such I/O circuits 84, 86, 88 and 90 being shown. The I/O circuit 84 couples through a modulate-demodulate unit 92 (MODEM) with the acoustic couplers 48, 49 for providing external communications. It is to be understood that other forms of external coupling 48, 49 may be utilized as desired, for example such as coaxial cable or wire connections for providing external communications. If only two I/O circuits are provided, they are the circuit 84 for external communications and the circuit 88 for interconnection with the CAM.

An I/O circuit 86 may be provided connected to a socket 94 for plug connection to an external disc memory storage unit 96 when additional local data storage capacity is desired. The further I/O circuit 88 may be connected with a socket 98 for plug connection with an external printer 100 or with an external tape recording unit 102. The I/O circuit 88 is also connected to an adapter circuit 104 which serves to convert the signals, i.e. circuit closures, produced by depressing keys on the keyboard 26 into binary coded digits. This adapter circuit 104 may include a network of diodes as is well known to those skilled in the art.

The adapter unit 104 is plug connected at 50 with a circuit connection 108 for actuating the prompter and status unit 109 having a screen 46 which in this embodiment contains sixteen printed messages on a translucent panel. The prompting and status unit 109 contains an individual light source illuminating each message. Thus, there are sixteen circuits in the connection 108 for flashing the respective messages, eight messages for prompting which may be illuminated by yellow lights and eight for error indication which may be shown by red lights.

In FIG. 3 the read out display 115 and its associated viewing panel 47 is shown included within the CAM, whereas in FIGS. 1 and 2 it is shown included in the CMU. As mentioned previously this read out display unit may be included in either or both sections. This read out display 115 comprises a plurality of gas discharge character readouts connected by a circuit 113 with the adapter unit 104.

The multiplexer 66 serves to control the addressing of the program memory units 72, 74, 75, 76, 77 and 78, as indicated by the dashed line 110. The other multiplexer 68 controls the addressing of the four I/O circuits 84, 86, 88 and 90, as shown by dashed lines 111 and serves to control the addressing of the prompter and status unit 109 and the read-out unit 115, as indicated by the dashed lines 112.

It is possible to include the adapter 104 within the CAM. However, the arrangement as shown in FIG. 3 in which the keyboard adapter is located in the CMU is preferred as being more economical, because this one keyboard adapter does not need to be repeated. It can service the keyboards of the various CAMs when they are plugged into the CMU.

It is to be noted that in order for the management control apparatus 20 to operate, the CMU 22 and the CAM 24 must be plugged together as shown in FIG. 1. Neither component 22 nor 24 can operate without the other. The CMU is adapted to operate with various CAMs. Each CAM contains all of the attributes which are unique to and convenient for a particular management application including prompting and error communications with the operator which are suited to the nature of the application.

The unique attributes are:

1. The nature and layout of the operator keyboard 26 or the assignment of the respective keys for particular functions.

2. The prompting and error display unit 109 and screen 46 for instructing the operator.

3. The specific elements of the program 76, 77, 78, which are unique to the management application to be handled (the application program).

4. In some applications, for example, in using management control terminals for controlling a chemical processing plant, the way in which the readout is displayed may also be a unique attribute of the particular application being handled.

When a sequence of CAMs are to be used, the initial CAM may be arranged to perform updating operations upon the data memory 61, 62 in the CMU such that the updated data can be used by subsequent CAMs to conduct new or more advanced operations. An example of such an updating sequence is for the initial CAM to be used in an order entry application. Then the next CAM is used in an inventory control application to perform inventory transactions on the modified data resulting from entry of the orders. A further CAM can be used in a cost accounting application upon the updated inventory data file, and so forth.

Erroneous or fraudulent use of a subsequent CAM is prevented by requiring each CAM in the sequence to read, and upon completion of its application, to write a secret authorization code into the data memory 61, 62. If an incorrect code is read, the MCT will not operate.

Figure 5:
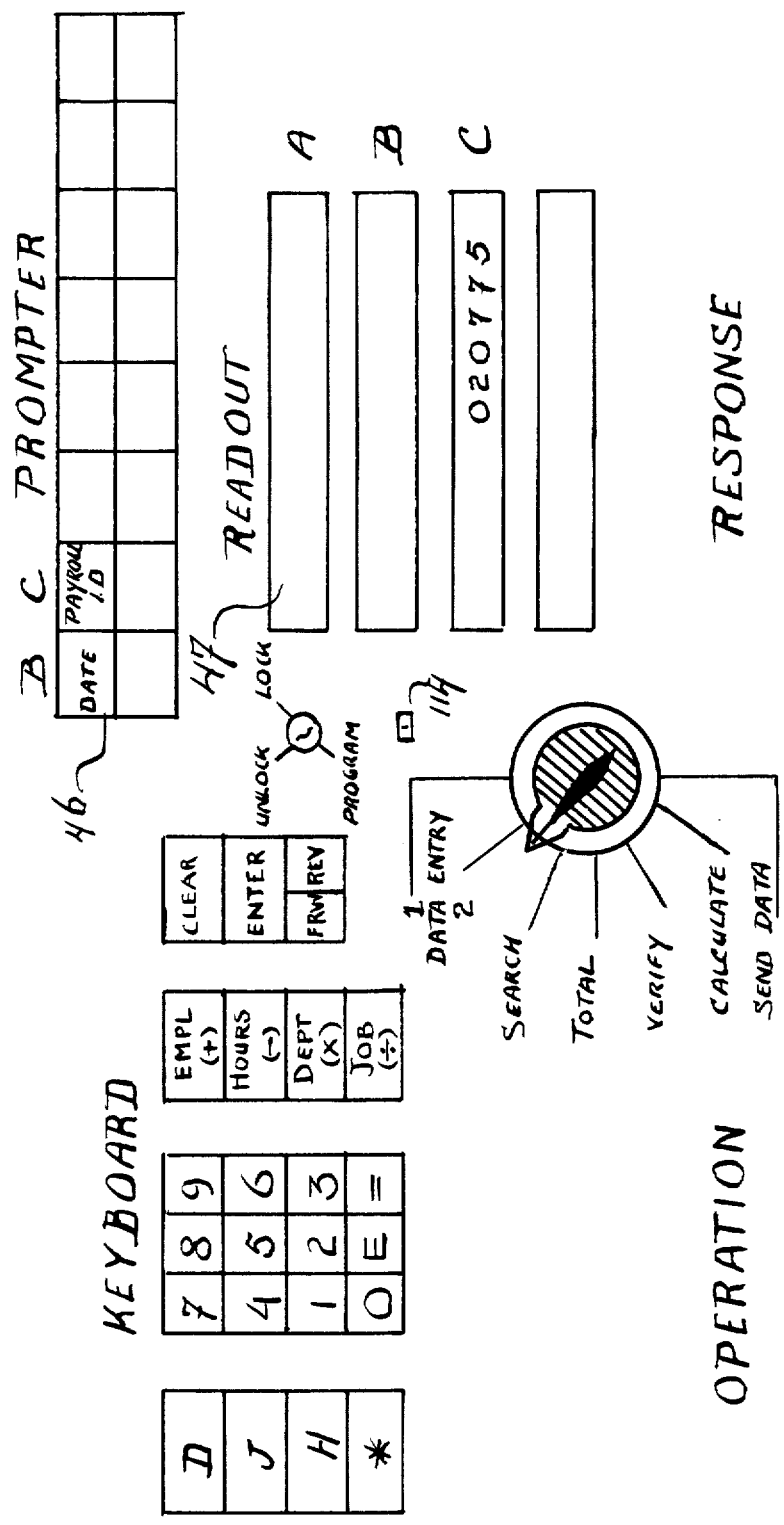

FIGS. 5 through 7 inclusive serve to illustrate the operation of the management control terminal apparatus of FIGS. 1 through 3 in a typical payroll transaction, for example, which is outlined as follows:

EXAMPLE 1.: Typical Payroll Transaction

DATE : FEBRUARY 7, 1975
PAYROLL ID : 3000
EMPLOYEE NO. : 1111
DEPT. NO. : 3210
JOB NO. : 0744
TIME IN : 0830
TIME OUT : 0500
HOURS WORKED : 0800
ENTRY MODE : FORMATTED DATA (FIG. 4)
ERRORS : NONE

With references to FIG. 1, the operator moves the power switch 114 to the "ON" position and inserts the key into lock 42, turning it to the "UNLOCK" (operate) position. The mode selection knob 44 is turned to the DATA ENTRY 2 position. A "DATE" prompting message immediately appears on the prompter display screen 46 (FIG. 5) in response to which the operator depresses keys 0-2-0-7-7-5 to enter the date. Upon entry of this date, numbers "020775" appear on the readout display screen 47. A prompting message "PAYROLL ID" now appears on the prompter screen 46.

As indicated in FIG. 6, the keys 3-0-0-0 are depressed to enter the identification number for the payroll. The number "3000" appears on the readout screen 47, while the next successive prompting message "EMPL NO" immediately appears on the prompting display 46. In response to this reminder message, the operator depresses keys 1-1-1-1 to enter the employee number. The readout screen 47 displays employee number "1111", while the next prompting message "DEPT. NO" flashes on the prompting screen 46 to remind the operator to enter the department number.

At this point, as shown in FIG. 6, keys 3-2-1-0 are depressed to enter the department number. This number "3210" appears on readout screen 47, while the remainder "JOB NO" shows on prompter screen 46. Accordingly, the operator depresses the keys 0-7-4-4 for the job number, and number "0744" appears on the readout screen 47. The prompter message "TIME IN" flashes on display screen 46.

Keys 0-8-3-0 are depressed (FIG. 7) to enter the data as to the time when the employee punched the time clock upon entering the department. The number "0830" now appears on the readout display 47, while the next prompting message "TIME OUT" appears on the prompter screen 46.

As shown in FIG. 7, the keys 0-5-0-0 are depressed to enter the time at which the employee punched out on the time clock, and number "0500" is indicated on the readout screen 47. The final prompting message "HOURS WORKED" shows on the prompter screen. The operator completes the transaction by depressing keys 0-8-0-0 to indicate that eight hours were worked, and the number "0800" is now seen on the readout screen 47. In the event that the hours worked did not correspond with the difference between TIME IN and TIME OUT, a "FAULTS VERIFY" signal would flash on the prompter screen 46. Upon completion of this transaction for employee number 1111, the operator repeats steps E through J, as seen in FIGS. 5, 6 and 7, to enter the data for the next employee, and so forth.

There are similar management control terminals for use in other departments by other department managers. Thus, each manager has the advantage of local capture, storage and processing of the payroll data in off-line operation, i.e. withouth involving the large central computer. After the completion of the activity period, such as at night during "off" hours, the MCT 20 transmits batch data to and may receive instructions from the large centralized computer.

Figure 8:
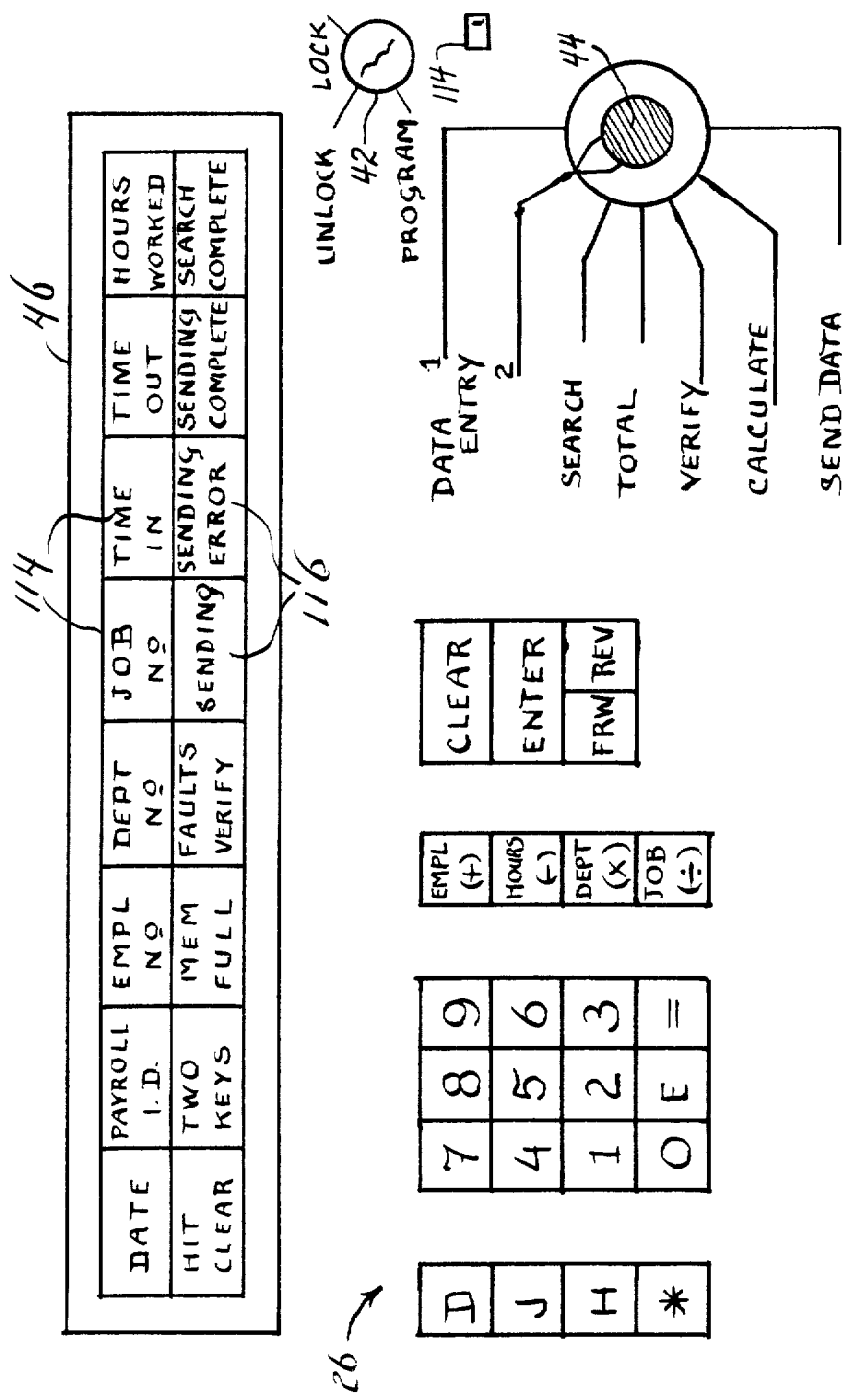
FIG. 8 shows the layout of the keyboard and of the prompting and error display means 46 of the CAM for handling payroll applications, such as illustrated in FIGS. 5-7.
Figure 12:
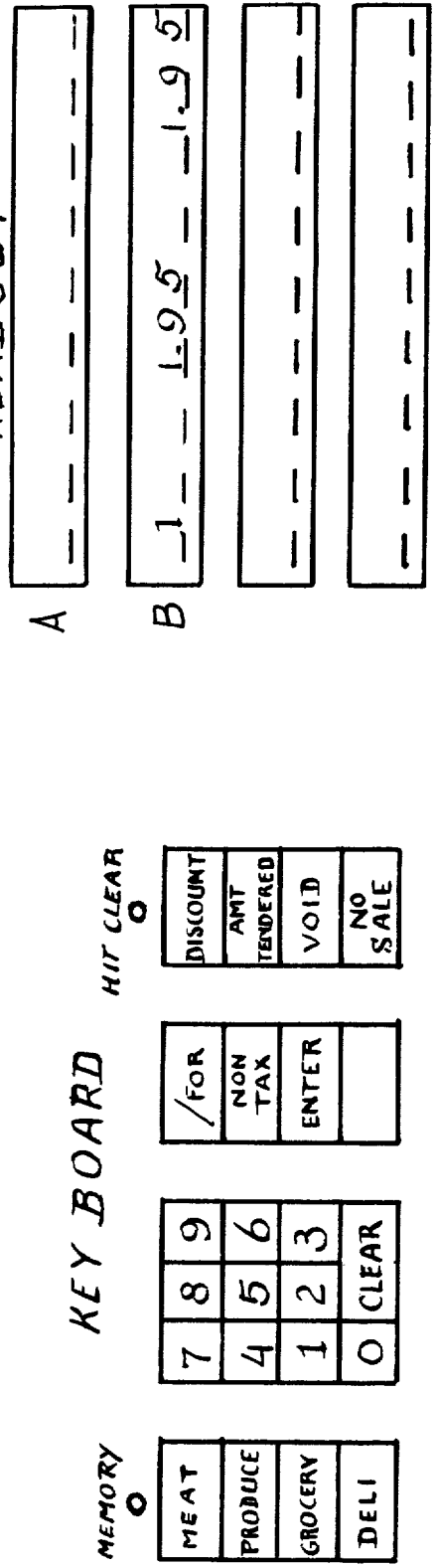
Figure 13:
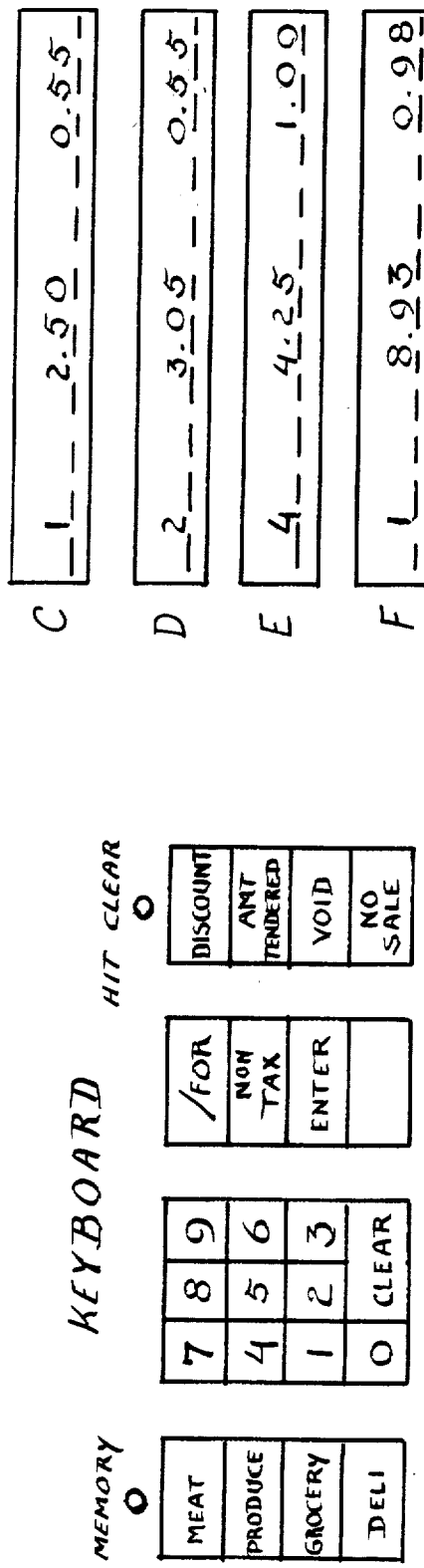

FIG. 8 is an enlarged view of the CAM keyboard and prompter and error indicating device 46 as specifically arranged for handling payroll applications. The messages in the prompter and error indicator display device 46 may be written on translucent panels 114 and 116, so that they normally are not visible. When a light is illuminated beneath any one of these panels, the message thereon becomes visible and also the color of the panel then appears. To emphasize the distinctions between the prompting messages on the upper row of panels 114 and the error messages on the lower row of panels 116, the translucent panels 114 may advantageously have a muted yellor or green background color; whereas, the background of panels 116 may be red for attracting immediate attention to the error being shown.

FIG. 9 is a schematic diagram illustrating how the software operates as incorporated in the circuit of FIG. 3. The control programs serving the handler function as indicated at 121, 122, 123, 124 and 125 are located in the control sequence program memory units 72 and 74. The control programs providing the functions as indicated at 126 and 128 are located in the application program memory units 76, 77 and 78.

Operation of the SEARCH mode will now be explained in further detail. In using the SEARCH mode of operation the operator keys into the keyboard the employee number under which the search is to be made. The management control terminal searches under that employee number and gives the hours worked. The operator can press the forward or reverse button which shifts to the field in that format which is before or subsequent to the field for hours worked. For example, the operator can step forward from field-to-field until he reaches the date field, which will then show the date on which these hours were worked.

The second time that the operator keys in the same employee number while in the SEARCH mode, the management control terminal will show the hours worked for the next earlier transaction. Once again, the operator can step forward or backward from field-to-field in that earlier transaction for this employee, and so forth.

Thus, the operator can search in an individual field and can search for a specific entry, for example, such as the hours worked by a particular employee on a particular date.

In the TOTAL mode, when the operator presses a department number or an employee number, the management control terminal will show the total hours recorded as having been worked for that department or for that employee.

FIG. 10 illustrates generally a record format, such as is used in a number of management control applications, for example, such as for a cash register in billing or placing orders for materials.

Example 2 in FIG. 10 is a generalized example of the handling of formatted data for a cash register application. A specific example of such an application is discussed further below.

Example 3 in FIG. 10 is a generalized example of the handling of formatted data for a shipping order application in which the tax is applied to the total amount of the transaction, i.e. including the total price plus the shipping cost. The notation NE means the amount appearing in line N of field E. The notation $N_{+1}F$ means the amount appearing in the $N_{+1}$ line of field F, and so forth.

As will be understood from a review of the generalized examples of formatted data and the handling of such data, as shown in FIG. 10, the functions indicated at 128 (FIG. 9) for handling such formatted data include the following:

a. Identification of fields.
b. Identification of field limits in the number of characters and in the right justification of decimal numbers.
c. Performing operations required on specific fields in specific columns.
d. Storing specific factors and multiplying the values occurring in a specific field at a specific line by that factor, for example such as labor rate or a tax rate.
e. Converting hours and minutes to fractions, and pounds and ounces to fractions.
f. Storing the records.

FIG. 11 illustrates the keyboard arrangement of the CAM for handling a cash register application. FIGS. 12-15 show the sequence of steps for handling the following cash register application, which is shown by way of an example.

EXAMPLE 4

| CASH REGISTER APPLICATION | | | | |
|---|---|---|---|---|
| Sales Person 322 | Tax 5% | Amount Tendered $20.00 | | |
| Item | Dept. | Amt/Quan | Unit Price | Tax |
| 1. Ham | Meat | 1 lb. | $1.95 | N |
| 2. Heinz Ketchup | Grocery | 2 | $ .55 | N |
| 3. Dish Cloths | " | 4 | $4/1.00 | Y |
| 4. Cabbage | Produce | 3 | $3/1.00 | N |
| 5. Dust Pan | Grocery | 1 | $1.25 | Y |
| 6. Franks | Meat | 1 lb. | $ .98 | N |
| 7. Potato Salad | Deli | 2 lbs. | $ .69 | N |
| 8. Discount Coupon | Grocery | 4 | $ .10 | — |
| 9. Discount Coupon | Deli | 2 | $ .15 | — |

FIG. 16 shows a modified embodiment of the management control terminal in which the keyboard is included in CMU 22A and has blank keys, each of which is spaced somewhat from its neighbor. The custom application module 24A includes overlay means 180 containing indicia 182 for assigning different functions to the keys. For example, as shown this overlay means 180 is a masking cover sheet which lays down over the keyboard with multiple cut out openings 184 through which the individual keys of the keyboard 26A can protrude. This masking cover sheet has indicia 182 such as numbers and letters printed thereon in alignment with the various keys, i.e. immediately above each respective key as seen by the operator in looking down at the masked keyboard, to assign the respective functions to the keys. There is an application program unit 76 and a prompter control unit 77 in the CAM 24A, and there are disconnectible electrical connectors 50' for electrically interconnecting the components 22A and 24A.

In addition, the CAM 24A includes prompter display means 190 in the form of a second masking cover sheet with transparent windows 192 containing the respective prompting messages or symbols 194. These windows overlie rectangular lighted areas of the CMU 24A for flashing the appropriate prompting message when the region is illuminated. The overlay panels 180 and 190 are hinged by pivots 196 to the central portion 198 of the CAM 24A. Thus, when this CAM 24A is removed from the CMU 22A, these panels can be folded down along side the central portion 198 for providing a compact configuration suitable to be carried in a pocket or in a small case and for easy mailing.

In a further embodiment of the invention, the management control terminal can be incorporated into a telephone unit, for example, one of the touch-tone type. A display area for prompting and read-out is provided near the touch-tone keyboard of the telephone unit. The unit is arranged such that a CAM can be plugged into the telephone unit, which adapts the telephone unit for a particular application such as one of those described above. The CAM may include overlay means 180, as shown in FIG. 16, for overlaying the keys of the touch-tone keyboard, thus assigning different functions to the keys.

The telephone unit is provided with voltage from the central station, and this electrical power can serve to energize the components of the management control terminal. Alternatively, it may be battery energized or have a power supply which is energized only when the CAM is plugged in.

The management control terminal can be arranged to operate when the handset is on or off its cradle. One of the programs which can be provided is to time the length of each telephone call and to indicate the minutes and seconds on the display area. Thus, the user can readily limit calls to a predetermined length of time by watching the time display. A further program can be provided which keeps a running total of the time that the telephone is used each day or each week or month. Thus, management can readily determine whether the telephone unit is being under or over used.

Among the advantages of including the management control terminal in a telephone unit is that the touch-tone keyboard is available, thus saving the cost of providing such a keyboard. Also, this makes a compact installation since the telephone unit serves to house and provide the management control terminal as one integrated piece of equipment rather than having two pieces of equipment to contend with on a desk or table. Moreover, the existence of the telephone lines through a department or company facilitates intercommunication between the various management control terminals and a centralized computer, if desired.

The electronic components shown in FIG. 3 are commercially available as follows:

| Component | Commercial Source |
|---|---|
| Microprocessor 52 | Intel 4004 |
| Power Supply 53 | Power Supplies, Inc. |
| Clock 56 | Intel |
| Data Memory 61 | Intel 1402 Shift Registers |
| Data Memory 62 | " |
| Interface 62a | Intel 3205, 4008, 4009 |
| Multiplexer 66 | Intel |
| Multiplexer 68 | Intel 3205, 4008, 4009, plus integrated circuits |
| Control Sequence Program 72 | Intel 4001 ROM |
| Control Sequence Program 74 | Intel 4001 |
| Variable Factors Memory 75 | Intel 1103 |
| Application Program Memory 76 | Intel 4001 ROM |
| Application Program Memory 77 | Intel 1702 |
| Application Program Memory 78 | Intel 1101 |
| I/O 84, 86, 88, 90 | Integrated Circuits - 7400 Series |
| Modem 92 | Novation |
| Adapter 104 | Integrated Circuits |
| Read-Out 47, 111 | Sperry |

As a further example of an advantageous use of the MCT 20 or 20A, it may serve as a field test unit for testing various units of commercial electronic equipment in the field. Such units of commercial electronic equipment include point-of-sale computer terminals, other types of terminals for handling communications and/or data, reservations, peripheral equipment for computer systems, such as printer units, and electronic process controllers. Thus, the field test MCT includes a CMU 22 or 22A which can be electrically plugged into a test socket on the electronic unit to be tested. The field test MCT includes a different CAM for testing each of the respective units of electronic equipment. Thus, when the particular CAM is placed together with; and is electrically interconnected with the CMU, the MCT is made applicable for carrying out predetermined steps for testing the particular unit of commercial electronic equipment in a prescribed test sequence.

In a further embodiment, the MCT is adapted to be used with a TV set for purposes of information retrieval. The information to be retrieved may be educational, scientific, financial, sports or entertainment shows. The MCT 20 or 20A includes a CMU 22 or 22A which can be electrically plugged into the TV set for controlling the set. A separate CAM is used for obtaining each predetermined type of information desired. For example, one CAM would be used for retrieving entertainment shows to be displayed on the TV set; another CAM for retrieving cooking recipes; a third CAM for retrieving financial information; a fourth CAM for retrieving horse racing information, such as Kentucky Derby races, and similar events; a fifth CAM for scientific information, and so forth.

In still a further embodiment, the MCT is used as a controller for controlling different commercial processes, such as for the injection molding of different plastic compositions. Then, a different CAM is used for modifying the MCT to make its operation particularly applicable for controlling the particular commercial process being carried out.

Inviting attention to FIG. 2, it is seen that the CMU 22 includes an upstanding back 201 on which is located the read-out screen 47. There is a low front portion 202 which projects forward from the lower portion of the upstanding back 201 and has a support deck 203 thereon. Detachable mechanical fasteners 204, for example, such as spring clips, are adapted to hold the CAM 24 in a predetermined position upon the support deck 203. When this CAM is located in this predetermined position, it completes the physical assembly of the CMT 20. The CAM 24 includes second detachable electrical connector 50' (FIG. 3) for mating with the first detachable electrical connector 50 located in the CMU. The second detachable electrical connector 50' becomes mated and interconnected with the first detachable electrical connection means 50 when the CAM is placed upon the support deck 203 in the predetermined position.

In FIG. 16, the central portion 198 of the CAM 24A includes a circuit board 210 adapted to slide into a receptacle slot 212 in the CMU 22A. The key function assignment overlay panel 180 is mounted on the circuit board 210 by hinge pivot 196. This hinge pivot 196 is located on a flange 214 on the central portion of the CAM 24A, while the hinge pivot 196 for the prompting overlay panel 190 is located on another flange 216.

The first detachable electrical connector 50 is located at the bottom of the receptacle slot 212 in position for second detachable electrical connector 50' on the circuit board 210 to become interconnected therewith when the CAM 24A is placed in the predetermined position for completing the physical assembly of the MCT 20A.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

I claim:

1. Management control terminal apparatus specifically adaptable to a particular management application comprising:

first and second sections which are detachable and separatable one from the other, said sections being matable together in operative relationship for forming said management control terminal apparatus;

said first and second sections having respective first and second mating detachable electrical connector means for electrically interconnecting said first and second sections to complete said management control terminal apparatus when said sections are mated together in operative relationship;

said first section of the terminal apparatus including:
 a. an upstanding back and a low front portion projecting forward from the lower portion of said upstanding back;
 b. said low front portion having a support deck thereon;
 c. input/output means for connection to other equipment;
 d. data memory means for storing data and microprocessor means for sequencing the operation of the terminal apparatus;
 e. read out display means with a display screen positioned in said upstanding back portion for displaying data;
 f. first circuit means for carrying data connected to said data memory means and microprocessor means, said input/output means, said read out display means and said first detachable connector means;

said second section of the terminal apparatus being adapted to be removably mounted upon said support deck in a predetermined position thereon with said second electrical connector means mating with said first electrical connector means when said second section is mounted in said predetermined position on said deck, said second section including:
 g. a keyboard arranged for convenient use in performing a particular management application for entering data into said memory means relating to that particular management application;
 h. prompting means for prompting a human operator in the correct use of the keyboard for entering particular data as instructed by said prompting means to be in proper order for that particular management application;
 i. application program memory means pre-programmed for that particular management application for controlling the operation of said terminal apparatus to perform that particular management application;

j. second circuit means for carrying data connected to said second detachable connector means, said keyboard, said prompting means, and said application program memory means;

whereby when said second section is mounted upon said support deck of said first section with said first and second electrical connector means mated together, said management control terminal apparatus has a keyboard which is conveniently arranged for use in performing a particular management application, and the terminal apparatus is operationally and functionally completed and specifically adapted for conveniently carrying out that particular management application.

2. Management control terminal apparatus as claimed in claim 1, in which:

said support deck has detachable fastening means associated therewith for mechanically engaging said second section when said second section is placed in predetermined location upon said support deck for producing the mating engagement of the second electrical connector means with the first electrical connector means.

3. Management control terminal apparatus specifically adaptable to a particular management application comprising:

first and second sections which are detachable and separatable one from the other, said sections being matable together in operative relationship for forming said management control terminal apparatus;

said first and second sections having respective first and second mating detachable electrical connector means for electrically interconnecting said first and second sections to complete said management control terminal apparatus when said sections are mated together in operative relationship;

said first section of the terminal apparatus including:
a. a keyboard having a plurality of blank keys;
b. a plurality of light means arranged in a predetermined pattern;
c. input/output means for connection to other equipment;
d. data memory means for storing data and microprocessor means for sequencing the operation of the terminal apparatus;
e. read out display means with a display screen positioned in said first section for displaying data;
f. said first section having a receptacle and said first detachable connector means communicating with said receptacle;
g. first circuit means for carrying data connected to said data memory means and microprocessor means, said input/output means, said read out display means, said light means, said keyboard and said first detachable connector means;

said second section of the terminal apparatus being adapted to be removably inserted into said receptacle and having said second detachable connector means positioned thereon for mating with said first connector means when said second section is inserted into said receptacle, said second section of the terminal apparatus including:

h. first overlay means adapted to be placed on the keyboard in a predetermined position with respect thereto;
i. second first overlay means having predetermined regions adapted to extend between respective predetermined keys of the keyboard with indicia on said regions aligned with the respective keys for identifying to a user the functions being assigned to the respective keys by said second section;
j. second overlay means adapted to be placed over said plurality of light means in a predetermined position with respect to said light means;
k. said second overlay means having transparent windows containing predetermined prompting messages adapted to overlie the respective light means for flashing various prompting messages for prompting the user in the correct use of the keyboard for entering particular data in the order as required for that particular management application;
l. predetermined specific application memory means for that particular management application for controlling the operation of said terminal apparatus to perform that particular management application;
m. second circuit means for carrying data connected to said second detachable connector means, and said application memory means;

whereby only when and if said second section is inserted into said receptacle with said first and second connector means mated together and with said first and second overlay means in said predetermined positions will said terminal apparatus be completed and specifically adapted for that particular management application.

4. Management control terminal apparatus as claimed in claim 3, in which:

said keyboard is positioned on said first section on one side of said receptacle;

said plurality of light means are positioned on said first section on the other side of said receptacle;

said first section has a central portion adapted to be inserted into said receptacle; and said first and second overlay means are hinged to opposite sides of said central portion for swinging said first and second overlay means into their respective predetermined overlay positions when said central portion is inserted into said receptacle and for swinging said first and second overlay means against opposite sides of said central portion when said central portion has been removed from said receptacle for providing a compact configuration.

5. Management control terminal apparatus adaptable for various particular management applications comprising:

first and second sections which are detachable and separatable one from the other, said sections being matable together in operative relationship for forming said management control terminal apparatus;

said first and second sections having respective first and second mating detachable electrical connector means for electrically interconnecting said first and second sections to complete said management control terminal apparatus when said sections are mated together in operative relationship;

said first section of the terminal apparatus including:
a. input/output means for connection to other equipment;
b. data memory means for storing transactional data which has been entered by a user of the terminal apparatus and microprocessor means for sequencing the operation of the terminal apparatus;
c. read out display means for displaying data;
d. first circuit means for carrying data connected to said data memory means and microprocessor means, said input/output means, said read out display means and said first detachable connector means;

said second section of the terminal apparatus including:
e. a keyboard arranged for convenient use in performing a particular management application for entering transactional data into said memory means relating to that particular management application;
f. prompting means for prompting a human operator in the correct use of the keyboard for entering the particular transactional data as required in proper order for that particular management application;
g. application memory means containing application data defining particular predetermined processing of said transactional data to be carried out by said microprocessor means as required for said particular management application, said application memory means also containing prompting sequence data defining the particular sequence in which said microprocessor is to operate said prompting means as required for prompting a human operator in the correct use of the keyboard in carrying out said particular management application;
h. second circuit means for carrying data connected to said second detachable connector means, said keyboard, said prompting means and said application memory means;

whereby only when and if said first and second sections are mated together in operative relationship will said management control terminal apparatus be completed and specifically adapted for use in conveniently carrying out said particular management application.

6. Management control terminal apparatus as claimed in claim 5, in which:
said second section includes error display means for indicating to a human operator that transactional data has been incorrectly entered on said keyboard, and
said application memory means also contains error determining data defining predetermined correct characteristic limitations of the transactional data normally associated with said particular management application for causing said microprocessor means to actuate said error display means to indicate that an error has occurred whenever the operator deviates from said predetermined characteristic limitations during the entry of transactional data.

7. Management control terminal apparatus as claimed in claim 5, in which:
said second section includes manually adjustable control means for preparing the terminal apparatus for handling formatted transactional data to be entered in accordance with a predetermined record format having a plurality of lines of transactional data with predetermined fields in each line and with a predetermined number of characters in each field and for handling non-formatted transactional data having an unpredetermined number of characters per field, and
said application memory means also contains conversion data for causing said microprocessor means automatically to convert the transactional data which has been entered corresponding with at least one field of each line of said record format into revised data appropriate for the particular management application.

8. Management control terminal apparatus as claimed in claim 5, in which:
said second section includes manually adjustable control means for preparing the terminal apparatus for handling formatted transactional data to be entered in accordance with a predetermined record format having a plurality of lines of transactional data with predetermined fields in each line and with a predetermined number of characters in each field and for handling non-formatted transactional data having an unpredetermined number of characters per field and for operating in a search mode, and said keyboard includes at least one key for identifying a field of each line to be searched, and
said application memory means in said second section also contains search data for causing said microprocessor means when in said search mode to search through and retrieve the transactional data which has been stored in said data memory means corresponding to a predetermined identifying field of each line of said record format, and for causing said microprocessors means to sequentially display on said read out display means the retrieved transactional data associated with such predetermined identifying field in the respective lines.

9. Management control terminal apparatus as claimed in claim 5, in which:
said second section includes manually adjustable control means for preparing the terminal apparatus for handling formatted transactional data to be entered in accordance with a predetermined record format having a plurality of lines of transactional data with predetermined fields in each line and with a predetermined number of characters in each field and for handling non-formatted transactional data having an unpredetermined number of characters per field and for operating in a total mode, and said keyboard includes at least one key for identifying a field of each line with respect to which the stored transactional data identified by such field is to be totalized, and said application memory means in said second section also contains totalizing data for causing said microprocessor means when in said total mode to search through, retrieve, accumulate and totalize the transactional data which has been stored in said data memory means corresponding to a predetermined identified field of each line, and for causing said microprocessor means to display on said read out display means the totalized transactional data associated with such predetermined identified field in the respective lines.

10. Management control terminal apparatus adaptable for varous particular management applications comprising:
- first and second sections which are detachable and separatable one from the other, said sections being matable together in operative relationship for forming said management control terminal apparatus;
- said first and second sections having respective first and second mating detachable electrical connector means for electrically interconnecting said first and second sections to complete said management control terminal apparatus when said sections are mated together in operative relationship;
- said first section of the terminal apparatus including:
  a. input/output means for connection to peripheral devices of said terminal apparatus;
  b. data memory means for storing transactional data which has been entered by a user of the terminal apparatus and microprocessor means for sequencing the operation of the terminal apparatus;
  c. first circuit means for carrying data connected to said data memory means and microprocessor means, said input/output means, and said first detachable connector means;
- said second section of the terminal apparatus including:
  d. a keyboard arranged for convenient use in performing a particular management application for entering transactional data into said memory means relating to that particular management application;
  e. read out display means for displaying data;
  f. prompting means for promoting a human operator in the correct use of the keyboard for entering the particular transactional data as required in proper order for that particular management application;
  g. application memory means containing application data defining particular processing of said transactional data to be carried out by said microprocessor means corresponding to predetermined processing of said transactional data as required for said particular management application, said application memory means also containing prompting sequence data defining the particular sequence in which said microprocessor is to operate said prompting means as required for prompting a human operator in carrying out said particular management application;
  h. second circuit means for carrying data connected to said second detachable connector means, said keyboard, said read out display means, said prompting means, and said application memory means;
- whereby only when and if said first and second sections are mated together in operative relationship will said management control terminal apparatus be completed and specifically adapted for conveniently carrying out said particular management application.

11. Management control terminal apparatus as claimed in claim 10, in which:
- said second section includes error display means for indicating to a human operator that transactional data has been incorrectly entered on said keyboard, and
- said application memory means also contains error determining data defining predetermined correct characteristic limitations of the transactional data normally associated with said particular management application for causing said microprocessor means to actuate said error display means to indicate that an error has occurred whenever the operator deviates from said predetermined characteristic limitations during the entry of transactional data.

12. Management control terminal apparatus as claimed in claim 10, in which:
- said second section includes manually adjustable control means for preparing the terminal apparatus for handling formatted transactional data to be entered in accordance with a predetermined record format having a plurality of lines of transactional data with predetermined fields in each line and with a predetermined number of characters in each field and for handling non-formatted transactional data having an unpredetermined number of characters per field, and
- said application memory means also contains conversion data for causing said microprocessor means automatically to convert the transactional data which has been entered corresponding with at least one field of each line of said record format into revised data appropriate for the particular management application.

13. Management control terminal apparatus as claimed in claim 10, in which:
- said second section includes manually adjustable control means for preparing the terminal apparatus for handling formatted transactional data to be entered in accordance with a predetermined record format having a plurality of lines of transactional data with predetermined fields in each line and with a predetermined number of characters in each field and for handling non-formatted transactional data having an unpredetermined number of characters per field and for operating in a search mode, and said keyboard includes at least one key for identifying a field of each line to be searched, and
- said application memory means in said second section also contains search data for causing said microprocessor means when in said search mode to search through and retrieve the transactional data which has been stored in said data memory means corresponding to a predetermined identifying field of each line of said record format, and for causing said microprocessors means to sequentially display on said read out display means the retrieved transactional data associated with such predetermined identifying field in the respective lines.

14. Management control terminal apparatus as claimed in claim 10, in which:
- said second section includes manually adjustable control means for preparing the terminal apparatus for handling formatted transactional data to be entered in accordance with a predetermined record format having a plurality of lines of transactional data with predetermined fields in each line and with a predetermined number of characters in each field and for handling non-formatted transactional data having an unpredetermined number of characters per field and for operating in a total mode, and said keyboard includes at least one key for identifying a field of each line with respect to which the stored transactional data identified by such field is to be totalized, and said application memory means in said second section also contains totalizing data for causing said microprocessor means when in said total mode to search through, retrieve, accumulate and totalize the transactional data which has been stored in said data memory means corresponding to a predetermined identified field of each line, and for causing said microprocessor means to display on said read out display means the totalized transactional data associated with such predetermined identified field in the respective lines.

15. Terminal apparatus adaptable for various particular applications comprising:

first and second sections which are detachable and separatable one from the other, said sections being matable together in operative relationship for forming said terminal apparatus;

said first and second sections having respective first and second mating detachable electrical connector means for electrically interconnecting said first and second sections to complete said terminal apparatus when said sections are mated together in operative relationship;

said first section of the terminal apparatus including:
 a. input/output means for connection to other equipment;
 b. data memory means for storing trasactional data which has been entered by a user of the terminal apparatus and microprocessor means for sequencing the operation of the terminal apparatus;
 c. read out display means for displaying data;
 d. first circuit means for carrying data connected to said data memory means and microprocessor means, said input/output means, said read out display means and said first detachable connector means;

said second section of the terminal apparatus including:
 e. a keyboard arranged for convenient use in performing a particular application for entering transactional data into said memory means relating to that particular management application;
 f. application memory means including random access memory means containing application data defining particular predetermined processing of said transactional data to be carried out by said microprocessor means as required for said particular application, said application memory means also containing prompting sequence data defining the particular sequence in which said mircoprocessor is to operate said prompting means as required for prompting a human operator in the correct use of the keyboard in carrying out said particular application;
 g. said second section includes manually adjustable control means for preparing the terminal apparatus for operating in a program mode for changing application data contained in said random access memory means,
 h. prompting means for prompting a human operator in the correct use of the keyboard for entering into said random access memory means revised application data as required in proper order for establishing a revised application program, and
 i. second circuit means for carrying data connected to said second detachable means, said keyboard, said prompting means, and said application memory means.

16. Management control terminal apparatus adaptable for various particular management applications comprising:

first and second sections which are detachable and separable one from the other, said sections being matable together in operative relationship for forming said management control terminal apparatus;

said first and second sections having respective first and second mating detachable electrical connector means for electrically interconnecting said first and second sections to complete said management control terminal apparatus when said sections are mated together in operative relationship;

said first section of the terminal apparatus including:
 a. input/output means for connection to peripheral devices of said terminal apparatus;
 b. data memory means for storing transactional data which has been entered by a user of the terminal apparatus, and microprocessor means for sequencing the operation of the terminal apparatus;
 c. read out display means for displaying data;
 d. random access memory means in which variable data factors can be stored,
 e. first circuit means for carrying data connected to said data memory means and microprocessor means, said input/output means, said read out display means, said random access memory means and said first detachable connector means;

said second section of the terminal apparatus including:
 f. a keyboard arranged for convenience use in performing a particular management application for entering transactional data into said memory means relating to that particular management application;
 g. prompting means for prompting a human operator in the correct use of the keyboard for entering the particular transactional data as required in proper order for that particular management application;
 h. application memory means containing application data defining particular processing of said transactional data and defining particular processing of said variable data factors to be carried out by said microprocessor means as required for said particular management application, said application memory means also containing prompting sequence data defining the particular sequence in which said microprocessor is to operate said prompting means as required for prompting a human operator in carrying out said particular management application;
 i. manually adjustable control means for preparing the terminal apparatus for changing the variable data factors stored in said random access memory means through use of said keyboard;
 j. lock means which normally prevents use of the keyboard for entering variable data factors into said random access memory means; and
 k. second circuit means for carrying data connected to said second detachable connector means, said keyboard, said prompting means, said lock means and said application memory means.

17. Management control terminal apparatus adaptle for various particular management applications mprising:
first and second sections which are detachable and separatable one from the other, said sections being matable together in operative relationship for forming said management control terminal apparatus;
said first and second sections having respective first and second mating detachable electrical connector means for electrically interconnecting said first and second sections to complete said management control terminal apparatus when said sections are mated together in operative relationship;
said first section of the terminal apparatus including:
a. input/output means for connection to other equipment;
b. data memory means for storing transactional data which has been entered by a user of the terminal apparatus and microprocessor means for sequencing the operation of the terminal apparatus;
c. read out display means for displaying data;
d. random access memory means in which variable data factors can be stored;
e. first circuit means for carrying data connected to said data memory means and microprocessor means, said input/output means, said random access memory means, and said first detachable connector means;
said second section of the terminal apparatus including:
f. a keyboard arranged for convenient use in performing a particular management application for entering transactional data into said memory means relating to that particular management application;
g. prompting means for prompting a human operator in the correct use of the keyboard for entering the particular transactional data as required in proper order for that particular management application and for prompting a human operator in the correct use of the keyboard for entering variable data factors into said random access memory means,
h. application memory means containing application data defining particular predetermined processing of said transactional data to be carried out by said microprocessor means as required for said particular management application, said application memory means also containing prompting sequence data defining the particular sequence in which said microprocessor is to operate said prompting means as required for prompting a human operator in the correct use of the keyboard in carrying out said particular management application and for prompting a human operator in the correct use of the keyboard for entering variable data factors into said random access memory means; and
i. second circuit means for carrying data connected to said second detachable connector means, said keyboard, said prompting means, and said application memory means.

18. The method of providing a management control terminal which is specifically adaptable for a number of different management control tasks, comprising the steps of:
providing a first section of the terminal having a first detachable electrical connector, said first section of the terminal apparatus including:
input/output means for connection to other equipment;
data memory means for storing transactional data which has been entered by a user of the terminal apparatus and microprocessor means for sequencing the operation of the terminal apparatus;
read out display means for displaying data;
first circuit means for carrying data connected to said data memory means and microprocessor means, said input/output means, said read out display means and said first detachable electrical connector;
providing a plurality of second sections of the terminal each having a second detachable electrical connector, each respective second detachable electrical connector being engageable with said first electrical connector,
each second section of the terminal apparatus including:
a keyboard arranged for convenient use in performing a particular management application different from the particular management application conveniently performed by a keyboard in another of said second sections, said keyboard in each second section being useable for entering transactional data into said memory means relating to the respective particular management application for which the respective second section is conveniently useable,
prompting means for prompting a human operator in the correct use of the keyboard for entering the respective particular transactional data as required in proper order for that particular management application;
application memory means contaning application data defining particular predetermined processing of said trasactional data to be carried out by said microprocessor means as required for said particular management application, said application memory means also containing prompting sequence data defining the particular sequence in which said microprocessor is to operate said prompting means as required for prompting a human operator in the correct use of the keyboard in carrying out said particular management application; and
second circuit means for carrying data connected to said second detachable electrical connector, said keyboard, said prompting means, and said application memory means;
whereby said management control terminal can be completed and specifically adapted for use in conveniently carrying out various particular management applications.

* * * * *